(12) United States Patent
Takahashi

(10) Patent No.: US 7,042,117 B2
(45) Date of Patent: May 9, 2006

(54) POWER SUPPLY CIRCUIT FOR ACTUATOR OF AN ON-BOARD TRAVEL CONTROL DEVICE

(75) Inventor: Seiji Takahashi, Hisai (JP)

(73) Assignee: Sumitomo (SEI) Brake Systems, Inc., Mie (JP)

( * ) Notice: Subject to any disclaimer, the term of this patent is extended or adjusted under 35 U.S.C. 154(b) by 485 days.

(21) Appl. No.: 10/287,516

(22) Filed: Nov. 5, 2002

(65) Prior Publication Data

US 2003/0098619 A1 May 29, 2003

(30) Foreign Application Priority Data

Nov. 15, 2001 (JP) .............................. 2001-350114

(51) Int. Cl.
*H02J 1/00* (2006.01)
*B60L 1/00* (2006.01)
*H02J 7/00* (2006.01)
*B60L 3/00* (2006.01)

(52) U.S. Cl. ............................ 307/65; 307/30; 307/85; 307/141.8

(58) Field of Classification Search .................. 307/65, 307/80, 85, 141.8
See application file for complete search history.

(56) References Cited

U.S. PATENT DOCUMENTS 5,414,304 A    5/1995  Loistl et al. ................ 307/10.1
5,834,977 A *  11/1998 Maehara et al. ............ 330/297

FOREIGN PATENT DOCUMENTS

JP        2000-358338        12/2000

OTHER PUBLICATIONS

English Language Abstract of JP 2000-358338, Dec. 26, 2000.

* cited by examiner

*Primary Examiner*—Brian Sircus
*Assistant Examiner*—Hal I. Kaplan
(74) *Attorney, Agent, or Firm*—Greenblum & Bernstein, P.L.C.

(57) ABSTRACT

A power supply circuit for various actuators includes control lines associated with the actuators that receive power from a single voltage increasing circuit. The power supply circuit supplies power to the control lines by splitting or dividing power from a voltage increasing circuit, which is configured to increase an on-board power source voltage. Power is supplied to loads by driving circuits. The loads are individually driven by activating switches. An auxiliary control line is connected to one of the control lines so that auxiliary voltage is able to be supplied or applied. A voltage-holding circuit is provided in connection with the other control line to eliminate influence associated with the activation of one control line with respect to the other control line.

11 Claims, 4 Drawing Sheets

POWER SUPPLY CIRCUIT FOR ACTUATOR OF AN ON-BOARD TRAVEL CONTROL DEVICE

BACKGROUND OF THE INVENTION

The present invention relates to an improved power supply circuit for an actuator which is controlled by a travel control device for an automobile.

In order to ensure safe travel of a vehicle, an antilock control device (ABS) and a vehicle stability control device (ASC) are used. For example, in an ABS control device, actuators such as solenoid valves in a brake hydraulic circuit and an electric motor for a hydraulic pump are opened and closed or turned on and off in response to commands from an electronic control circuit for brake control of vehicle wheels.

As shown in FIG. 3, heretofore, the line for supplying power to a plurality of loads $L_1$ and the line for supplying power to the load $L_2$ are provided as independent lines in which signals generated by switches ($SW_1$, $SW_2$) 11a, 11b through voltage increasing circuits 10 in power lines from a battery power source are fed to driving circuits 14a, 14b through control lines 12a, 12b.

The electric motor 15b is activated when the pressure of the brake circuit is increased by a hydraulic pump in a hydraulic circuit during antilock control. On the other hand, the circuit 14a for supplying power to the solenoid valves 15a is always in a standby state when the electric motor 15b is ON. Thus, if a power is supplied through a line common to both, there is a possibility that upon the activation of the line for the electric motor 15b, one solenoid valve or two may malfunction. In order to avoid this, the two lines are provided independently of each other.

As described above, in order to prevent any influence of activation and deactivation of the motor on the circuit for supplying an electric power to the solenoid valves 15a, providing the power lines independently of each other is most effective. But for this purpose, it is necessary to provide a voltage increasing circuit for each line. This is disadvantageous in view of higher cost.

Thus, it is conceivable to provide a power supply circuit in which a single voltage increasing circuit is provided and the line for supplying power is split into two lines, one to supply power to electromagnetic valves and the other to supply power to an electric motor. Such a power supply circuit is shown in FIG. 4A. As shown, voltage VB fed from a battery power source is increased in a voltage increasing circuit 10. This voltage supply line is split into two. Signals by $SW_1$ in one line are input into a driving circuit 14a (FET transistor) for loads $L_1$ to supply power to the loads $L_1$, whereas signals of $SW_2$ in the other line are input into a driving circuit 14b (FET transistor) for a load $L_2$ to supply power to the load $L_2$.

The operation of the thus formed power supply circuit is shown in FIG. 4B. When the switch $SW_1$ is turned on, a signal $VG_1$ at the input point is input in the driving circuit 14a, and $VG_1$ will be VB+increased V, which is supplied to the loads $L_1$. After a predetermined time, when the switch $SW_2$ is turned on, a signal $VG_2$ at the input point is input in the driving circuit 14b, and $VG_2$ will be VB+increased V, which is supplied to the load $L_2$. But the moment that the switch $SW_2$ is turned on, the voltage of the loads L, is taken to increase the voltage $VG_2$ to the load $L_2$, so that the voltage $VG_1$ drops sharply, as illustrated in FIG. 4B. This state is similar to a state in which it is momentarily shut off. But later, $VG_1$ and $VG_2$ will increase at substantially the same rate. This is as if $SW_1$ malfunctions, meaning that the activation of the loads $L_1$ is influenced by the activation of the load $L_2$.

An object of this invention is to provide a power supply circuit in which various actuators are controlled. In addition, measures are taken for one actuator that tends to be influenced by the behavior of another actuator, in which power is supplied to a plurality of control lines through a single voltage increasing circuit, which can be manufactured at an economical cost.

SUMMARY OF THE INVENTION

According to this invention, there is provided a power supply circuit for actuators of an on-board travel control device, comprising driving circuits for driving a plurality of the actuators of the on-board travel control device, a plurality of control lines for respectively feeding control signals to the driving circuits, a power circuit having a voltage increasing circuit for supplying power from an on-board power source to the control lines, an auxiliary control line connected to one of the control lines for one actuator which is less likely to be influenced by the activation of the driving circuit associated with another actuator so that voltage of the on-board power source can be supplied to the auxiliary control line, and a voltage holding circuit being connected to and associated with the control line for another actuator to reduce the drop in voltage at the driving circuit for the another actuator.

With the thus constructed power supply circuit, by supplying a voltage from the on-board power source to an auxiliary control line connected to the control line for the driving circuit for one actuator, it is possible to apply a voltage of the on-board power source to this driving circuit by the time a control signal is fed from the control line for the driving circuit. Thus the difference in voltage when a control signal is fed by turning on the switch in the control line for the driving circuit becomes small. This correspondingly reduces influence even if the control line for the other actuator is being activated.

Since a voltage-holding circuit is provided in the control line for the other actuator, influence on the control line for the other actuator will decrease further when control signals are fed by the control line for one actuator. By adding the means for reducing influence on voltage drop in the control line for the other actuator, even if the load is activated by a control signal of the control line for the one actuator through the driving circuit, malfunction is avoided due to such influence, and the activation of the other actuator stops temporarily.

BRIEF DESCRIPTION OF THE DRAWINGS

Like reference numerals designate similar parts or elements throughout the figures and their corresponding descriptions. Other features and objects of the present invention will become apparent from the following description made with reference to the accompanying drawings, in which.

DETAILED DESCRIPTION OF THE PREFERRED EMBODIMENT

Figure 1A:
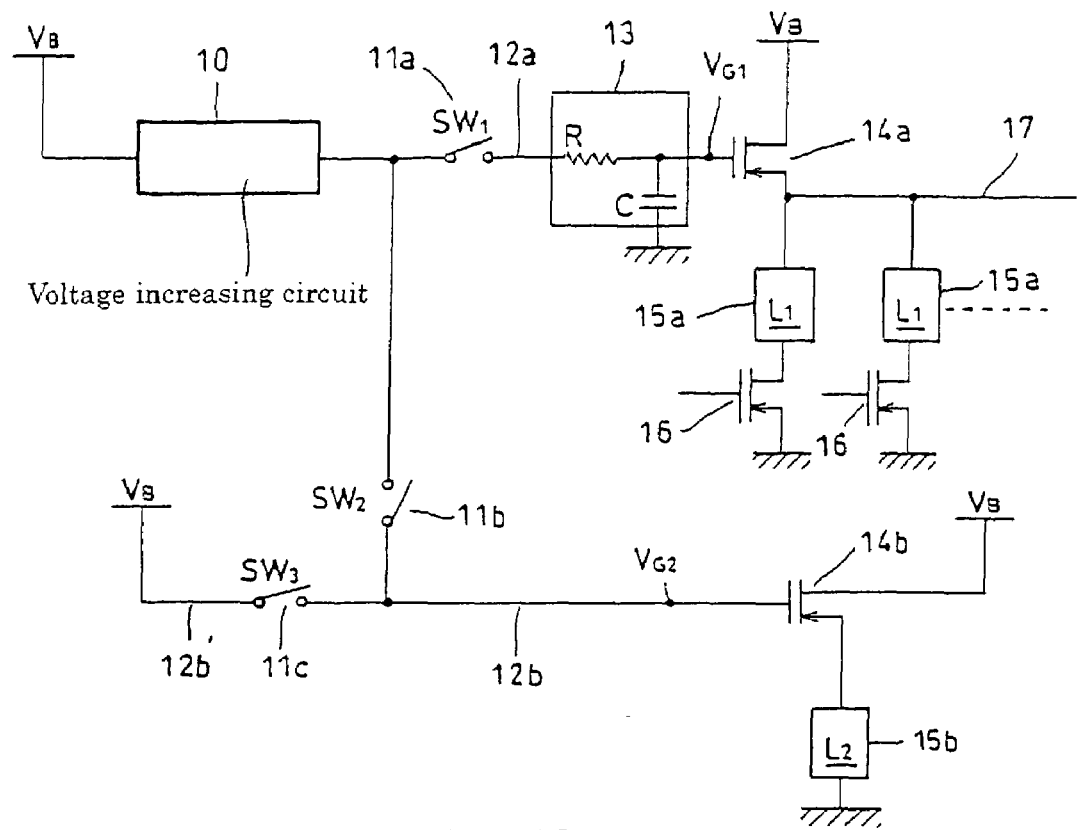
FIG. 1A is a block diagram of an embodiment of the power supply circuit.

An embodiment of this invention will be described with reference to the drawings. FIG. 1A is a block diagram of the power supply circuit embodying this invention. The power supply circuit is a circuit for supplying power to a load $L_2$ such as an electric motor 15$b$ for an antilock (ABS) control circuit, and to loads $L_1$ such as solenoid valves 15$a$. In the embodiment, the load $L_2$ is an electric motor 15$b$. Such an actuator is a load which requires a large driving current and is less likely to be influenced by other small actuators. It has such properties that once activated, it is kept operated for a predetermined period of time and the intervals between start and stop are relatively long.

Loads $L_1$ are a plurality of solenoid valves in this embodiment. Such actuators require a small driving current compared to motors, and while the load $L_2$ is being activated, these loads $L_1$, are also kept activated, and repeat on-off actions in a short time interval. While load $L_2$ includes at least one load, loads $L_1$ usually includes a plurality of loads (four in the embodiment). By suitably activating the loads $L_1$ with a command from an electronic control circuit, the flow of hydraulic pressure in the hydraulic circuit is changed over for antilock control.

Figure 2:
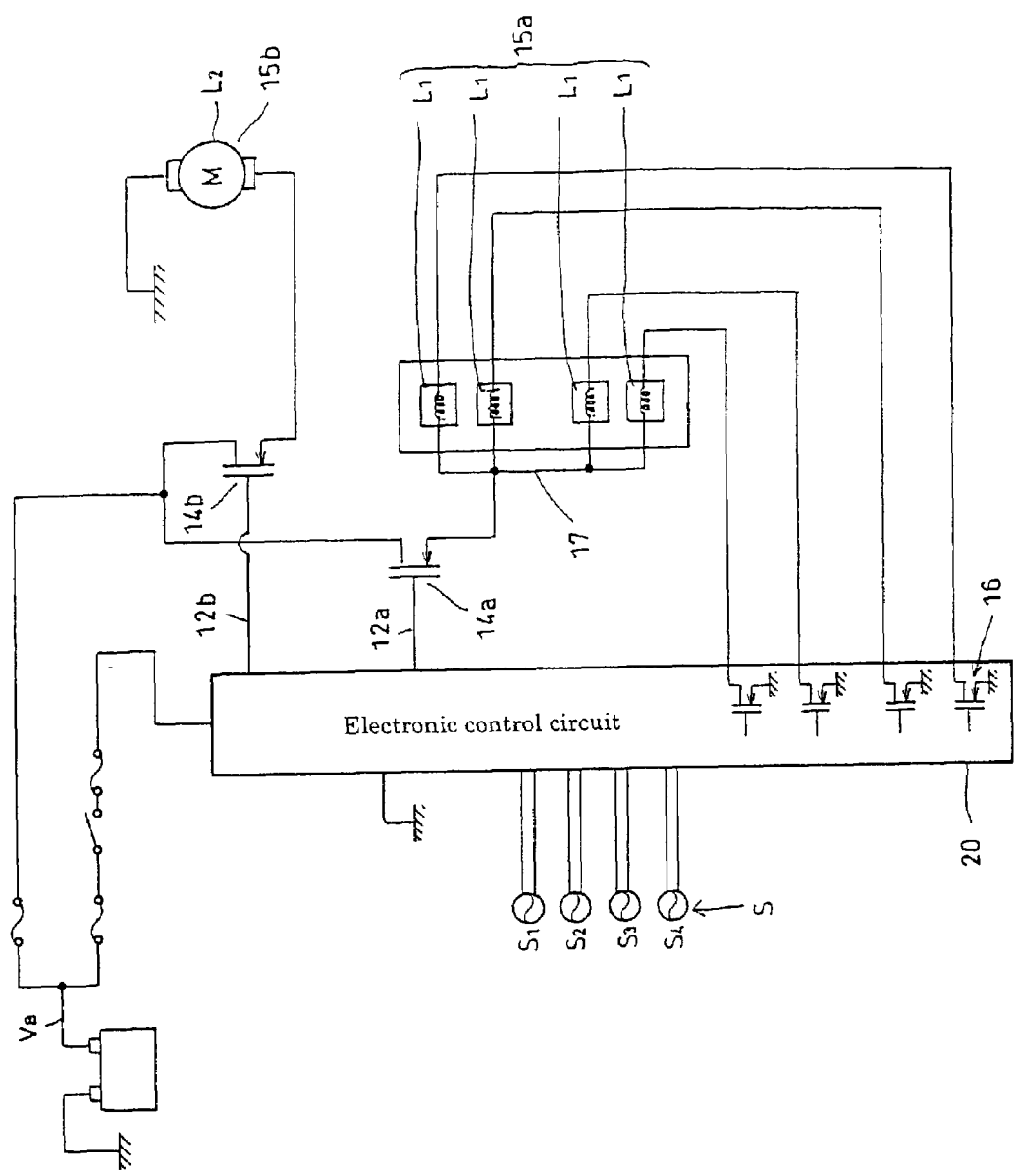
FIG. 2 is a block diagram of an embodiment of an electronic control device to which the power supply circuit of FIG. 1A is applied.
Figure 3:
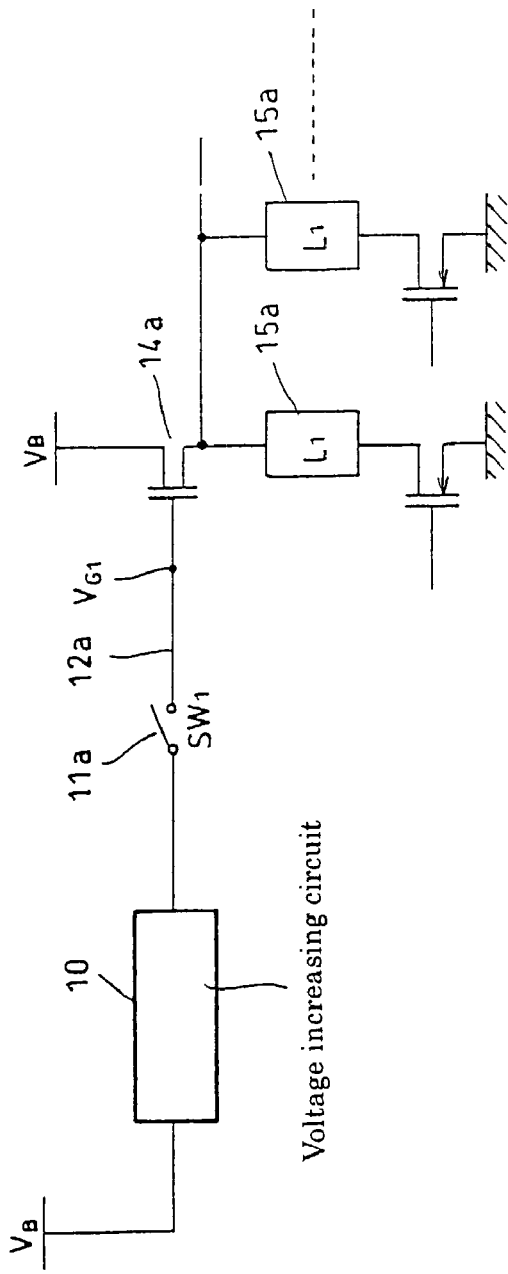
FIG. 3 is a block diagram of a conventional power supply circuit.
Figure 3:
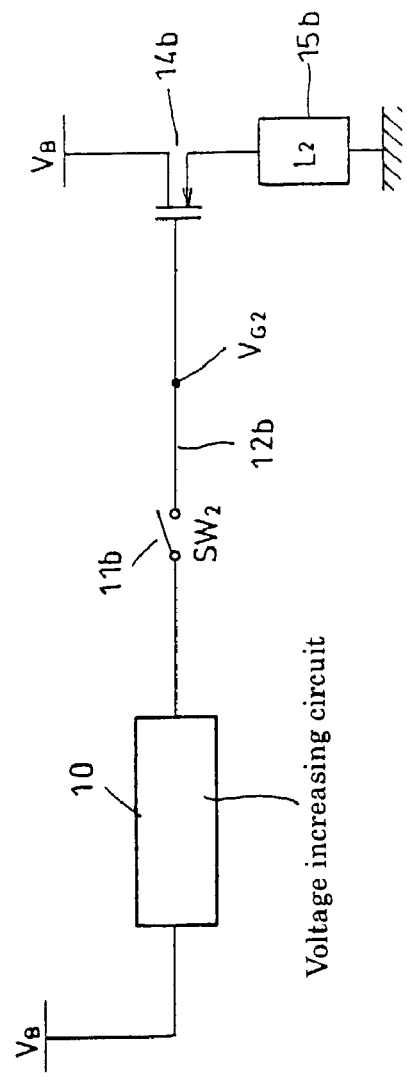
Figure 4A:
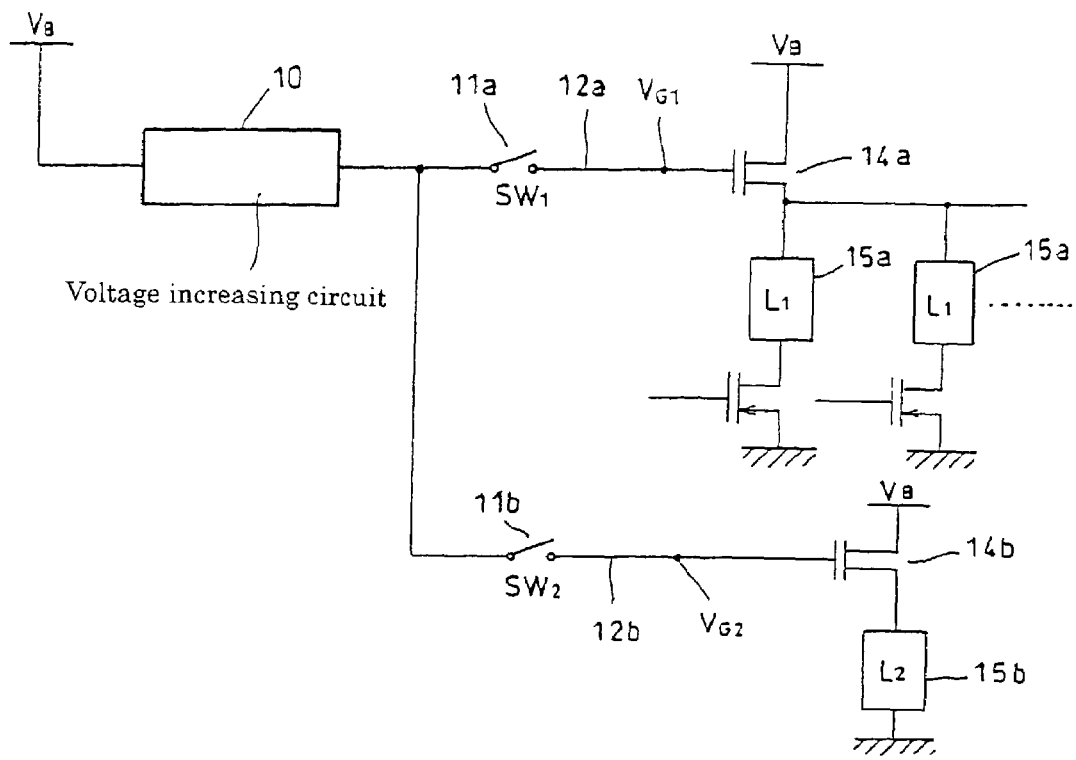
FIG. 4A is a block diagram of another conventional power supply circuit.
Figure 4B:
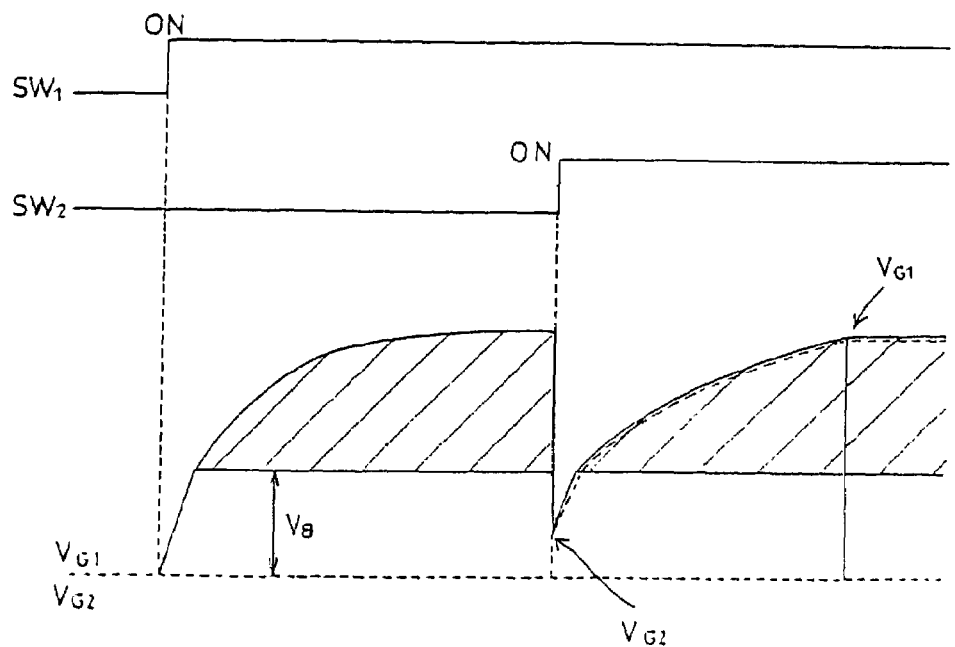
FIG. 4B is a view of the operation of the conventional power supply circuit illustrated in FIG. 4A.

Based on signals from a wheel speed sensor assembly S comprising wheel speed sensors $S_1$, $S_2$, $S_3$, $S_4$, each corresponding to one of the four vehicle wheels the power supply circuit, as illustrated in FIGS. 1A and 2, supplies power to a plurality of loads $L_1$ through a power line 17 and drives the load $L_2$ by giving control signals to control lines 12$a$, 12$b$ through switches $SW_1$–$SW_3$, which are illustrated as 11$a$, 11$b$ and 11$c$ in FIG. 1A, in an electronic control circuit 20 as shown in FIG. 2. For a plurality of loads $L_1$ of solenoid valves, by individually activating a plurality of switches 16 in the electronic control circuit 20, on-off actions are changed over.

The power supply circuit has one voltage increasing circuit 10, as illustrated in FIG. 1A, and supplies a voltage VB from a battery power source to the voltage increasing circuit 10 which comprises a pull-up resistor. The power increased to a predetermined voltage in the circuit 10 is split and supplied to two control lines 12$a$, 12$b$. A command signal is given to $SW_1$ inserted in the control line 12$a$ in the electronic control circuit 20. When a control signal is given to the control line 12$a$, it is sent through a voltage-holding circuit 13 comprising a resistor R and a capacitor C to a driving circuit 14$a$ (having a FET transistor). With this control signal, the driving circuit 14$a$ supplies a battery power (VB) to a plurality of loads $L_1$ through the power line 17. The loads $L_1$ are thus driven by the respective switches 16.

In the other control line 12$b$, a control signal is directly sent to a driving circuit 14$b$ (FET transistor) through $SW_2$, so that the load $L_2$ is driven by battery power (VB) supplied. To the control line 12$b$, an auxiliary line 12$b'$ is connected. $SW_3$ is inserted in the auxiliary line 12$b'$ so that the battery power (VB) is directly supplied. Both $SW_2$ and $SW_3$ are turned on and off by the command signal from the electronic control circuit to generate control signals.

Figure 1B:
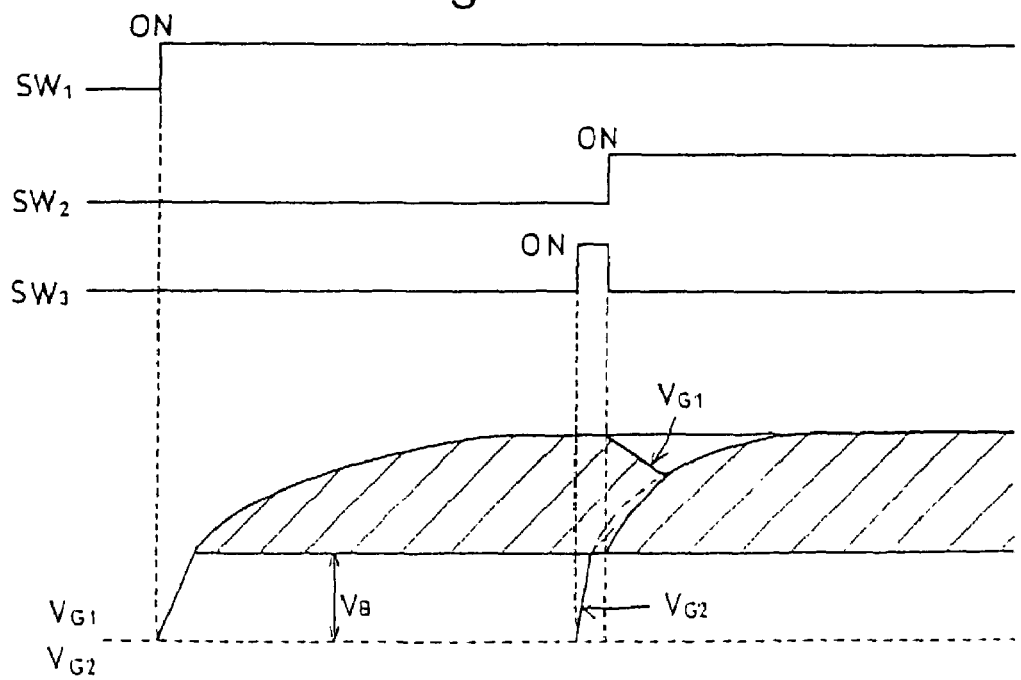
FIG. 1B is a view of the operation of the power supply circuit of FIG. 1A.

With the power supply circuit thus constructed, even if load $L_2$ is activated while loads $L_1$ is being activated, the operation of loads $L_1$ will not be influenced. Thus both of the loads will operate normally. As shown in FIG. 1B, if $SW_1$ is turned on and a control signal of a predetermined voltage is generated by the electronic control circuit 20, the loads $L_1$ will be driven through the driving circuit 14$a$. At this time, a predetermined charge will be stored in the capacitor C in the voltage-holding circuit 13.

After the voltage supplied to the loads $L_1$ through the driving circuit 14$a$ has increased to a predetermined voltage, the command signal for driving the load $L_2$ is given by first turning on $SW_3$ for a short time to precharge the control line 12$b$ through the auxiliary line 12$b'$, as illustrated in FIG. 1B, thereby keeping the voltage at VB. By turning on $SW_2$ at the moment when $SW_3$ is turned off, as illustrated in FIG. 1B, the difference between the voltage $V_{G1}$ supplied to the loads $L_1$ and the voltage $V_{G2}$ at the supply side is small because the control line 12$b$ has been precharged to VB beforehand. FIG. 1B shows in greater detail the associated switch and voltage timing of the power supply circuit of FIG. 1A.

Thus, the influence (voltage drop) on the side of the control line 12$a$ decreases, and also, to the control line 12$a$, a voltage corresponding to the amount of pressure increase is added due to the function of the voltage-holding circuit 13, and a voltage drop due to turning on of $SW_2$ is small. Thus the power supply to the loads $L_1$ continues without interruption, as illustrated in FIG. 1B. This practically avoids the influence associated with turning on $SW_2$.

The above-mentioned use condition of the loads $L_1$ does not mean that the supply of power to the load $L_2$ begins first, but show preconditions of use after power supply of to the loads $L_1$ and $L_2$ has started. In the embodiment, an ABS control circuit is cited as an example of on-board travel control devices. But besides ABS control circuits, there are ASC (Active Stability Control) control circuits, etc. It is a matter of course that the present invention is equally applicable to these other on-board control devices, too.

As described in detail, the power supply circuit for actuators according to this invention comprises driving circuits for driving a plurality of the actuators of the on-board travel control device, a plurality of control lines for feeding control signals to the respective driving circuits, a power circuit having a voltage increasing circuit for supplying power from an on-board power source through the voltage increasing circuit to the control lines, and an auxiliary control line connected to one of the control lines for an actuator which is less likely to be influenced by the activation of the driving circuit for other actuator so that voltage of the on-board power source can be supplied to the auxiliary control line. Also, a voltage-holding circuit is provided to reduce voltage drop in the driving circuit for the other actuators to eliminate influence.

Thus, advantages are obtained that even if the driving circuit is activated in the control line for one actuator while the driving circuit for the other actuator is being activated, there will be no such trouble as temporary deactivation of the driving circuit for the other actuator. Also the power supply circuit can be manufactured at an economical cost.

What is claimed is:

1. A power supply circuit for actuators of an on-board travel control device, comprising:
   driving circuits for driving a plurality of actuators of the on-board travel control device,
   a plurality of control lines for respectively supplying control signals to said driving circuits, a power circuit having a voltage increasing circuit for supplying power from an on-board power source to said control lines, an auxiliary control line connected to one of said plurality of control lines associated with a first actuator of the plurality of actuators, the first actuator being less likely to be influenced than others of the plurality of actuators by activation of the driving circuit associated with a second actuator of the plurality of actuators so that voltage of the on-board power source is configured to be supplied to said auxiliary control line, and a voltage holding circuit connected to and associated with the control line of the second actuator to reduce a voltage drop of the driving circuit associated with the second actuator.

2. The power supply circuit for actuators of an on-board travel control device as claimed in claim 1, wherein a plurality of second actuators are connected to said driving circuit associated with the second actuator, and switches are connected to the second actuators to control activation of the second actuators.

3. The power supply circuit for actuators of an on-board travel control device as claimed in claim 1, wherein said voltage-holding circuit comprises a resistor and a capacitor.

4. The power supply circuit for actuators of an on-board travel control device as claimed in claim 1, wherein the on-board power source is configured to apply a voltage from the on-board power source to said auxiliary control line.

5. The power supply circuit for actuators of an on-board travel control device as claimed in claim 2, wherein said voltage-holding circuit comprises a resistor and a capacitor.

6. The power supply circuit for actuators of an on-board travel control device as claimed in claim 2, wherein the on-board power source is connected to apply a voltage from the on-board power source to said auxiliary control line.

7. The power supply circuit for actuators of an on-board travel control device as claimed in claim 3, wherein the on-board power source is connected to apply a voltage from the on-board power source to said auxiliary control line.

8. The power supply circuit for actuators of an on-board travel control device as claimed in claim 5, wherein the on-board power source is connected to apply a voltage from the on-board power source to said auxiliary control line.

9. A power supply circuit for actuators of an on-board travel control device, comprising:

a first driving circuit that drives a first actuator of the on-board travel control device;

a second driving circuit that drives a second actuator of the on-board travel control device;

a first control line that supplies a control signal to said first driving circuit;

a second control line that supplies a control signal to said second driving circuit;

a power circuit that includes a voltage increasing circuit that supplies power from an on-board power source to said control lines;

an auxiliary control line connected to one of said first control line and said second control line so that voltage of the on-board power source is configured to be supplied to said auxiliary control line, and a voltage holding circuit provided in the second control line to reduce a drop in the voltage at the second driving circuit.

10. The power supply circuit as claimed in claim 9, wherein a plurality of second actuators are connected to said second driving circuit for the second actuator, and a plurality of switches are connected to the second actuators to control the activation of said plurality of second actuators.

11. The power supply circuit for actuators of an on-board travel control device as claimed in claim 10, wherein said voltage-holding circuit comprises a resistor and a capacitor.

* * * * *